United States Patent [19]

Shimizu et al.

[11] Patent Number: 5,167,751
[45] Date of Patent: Dec. 1, 1992

[54] APPARATUS FOR END CORRECTION OF AN AUTOMOTIVE TIRE CORD STRIP

[75] Inventors: Kentaro Shimizu; Osamu Fujiki; Mitsuru Hitotsuyanagi, all of Hyogo, Japan

[73] Assignee: Toyo Tire & Rubber Co., Ltd., Osaka, Japan

[21] Appl. No.: 657,234

[22] Filed: Feb. 19, 1991

[30] Foreign Application Priority Data

Feb. 26, 1990 [JP] Japan .................... 2-19187[U]

[51] Int. Cl.⁵ .................... B23Q 15/22; B65H 9/10
[52] U.S. Cl. .................... 156/502; 156/304.5; 156/394.1; 226/19; 198/472.1; 271/250; 271/901
[58] Field of Search .............. 156/304.1, 304.5, 394.1, 156/502; 226/15, 18, 19, 20; 198/381, 472.1, 690.1; 271/226, 227, 246, 248, 249, 250, 253, 254, 901; 209/904, 907

[56] References Cited

U.S. PATENT DOCUMENTS

| | | | |
|---|---|---|---|
| 3,834,519 | 9/1974 | Kitazawa et al. | 198/690.1 X |
| 3,892,616 | 7/1975 | Crites | 156/405.1 X |
| 3,921,795 | 11/1975 | Vandale et al. | 198/382 |

FOREIGN PATENT DOCUMENTS 62-105626  5/1987  Japan .
63-116838  5/1988  Japan .

Primary Examiner—Michael W. Ball
Assistant Examiner—Francis J. Lorin
Attorney, Agent, or Firm—Jordan and Hamburg

[57] ABSTRACT

An apparatus for end correction of an automotive tire strip member comprises a conveyor belt for conveyance of a tire strip member consisting of rubberized steel cords to a tire building drum, which conveyor belt is narrower than the strip member, a supporting plate disposed under the conveyor belt and adapted to support the belt, a guide plate extending in parallel with the lengthwise axis of the conveyor belt and disposed above the supporting plate and on one side thereof in such a manner that it is driven to advance and retreat with respect to the conveyor belt, and a magnet disposed below the supporting plate and toward one side thereof in such a manner that it is driven to advance and retreat with respect to the conveyor belt.

1 Claim, 2 Drawing Sheets

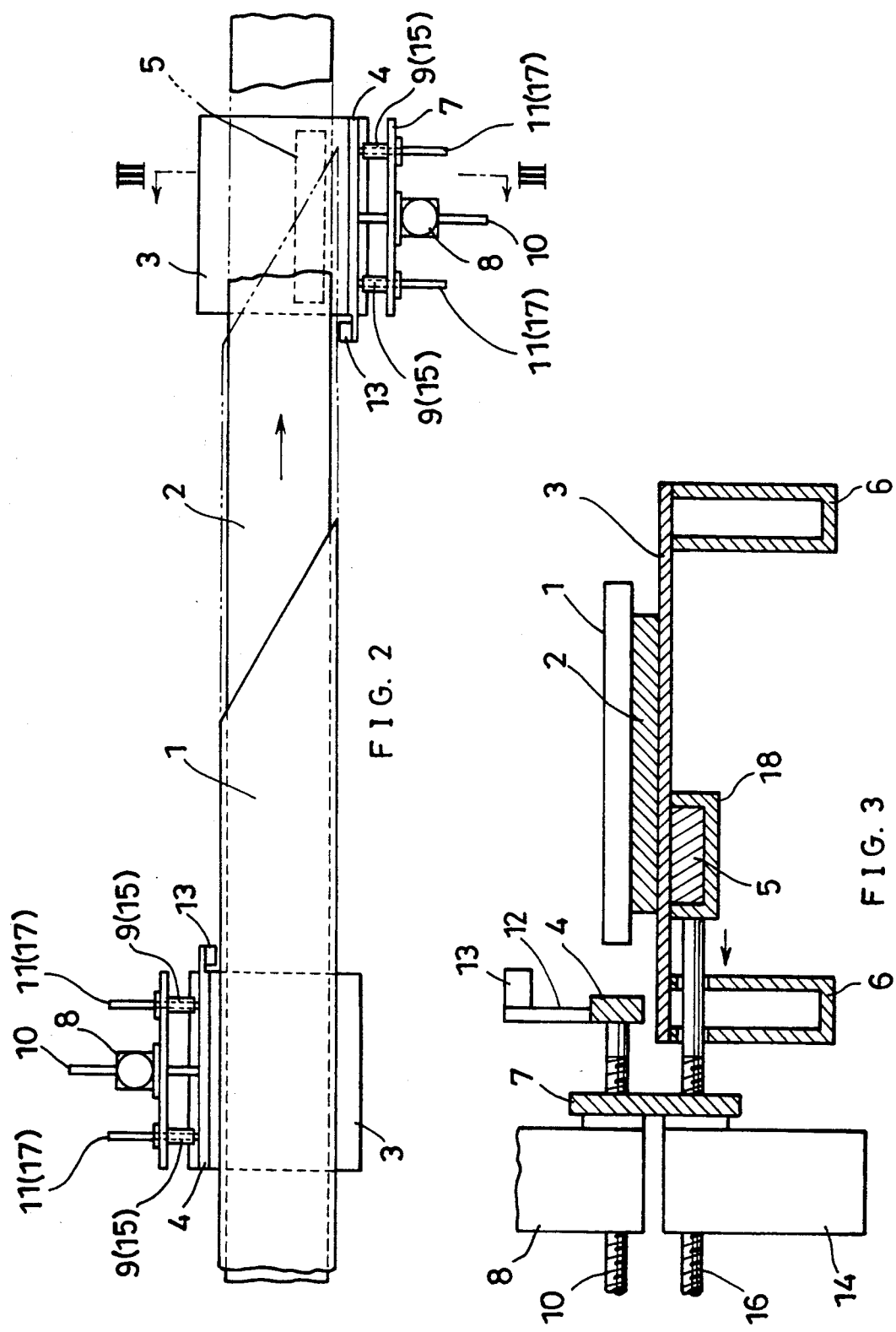

APPARATUS FOR END CORRECTION OF AN AUTOMOTIVE TIRE CORD STRIP

BACKGROUND OF THE INVENTION

1. Technical Field

The present invention relates to an apparatus for end correction which is used in the correction of beveled ends of a strip member consisting of rubberized steel cords such as a steel belt for an automotive tire.

2. Prior Art

The automotive tire building operation includes a step in which a belt or strip member consisting of rubberized steel cords is wound on a forming drum. This strip member comprises a multiplicity of steel cords oriented obliquely with respect to its lengthwise axis and is cut to length along the steel cords on a conveyor belt before it reaches the forming drum. However, it happens at times that the resulting beveled end is bent to the right or left, and some apparatuses for correcting for this bend have already been developed.

By way of example, Japanese Kokai Patent Publication No. 63-116838 discloses an apparatus which comprises a pair of rotatable correcting arms disposed above the conveyor belt carrying the strip member and on both sides of the strip member, with the free ends of the respective arms facing the beveled end of the strip member so that when the beveled end of said strip member has arrived between said arms, one of the arms is inwardly swung into a predetermined position from its initial position parallel to the conveyor belt to thereby correct the beveled end and following the rotation of the same arm back into the position along the direction of advance of the belt, the other arm is swung inwardly to bring its end into abutment against the end of the first mentioned arm making a predetermined angle of inclination to thereby hold the cut end of said strip member and align it with a predetermined angle.

However, the above known apparatus is such that one of its correcting arms is swung in the breadthwise direction of the belt about one end thereof and when it returns to the initial parallel position after correction of the beveled end of the strip member, a clearance is produced between it and the strip member. Therefore, when the other arm is actuated to hold the beveled end of the strip member, the beveled end tends to be deformed by the force applied by the other arm.

SUMMARY OF THE INVENTION

The present invention provides an apparatus for end correction which does not cause the aforesaid deformation of the beveled edge.

An apparatus for end correction of an automotive tire strip member according to the present invention comprises a conveyor belt for conveyance of a tire strip member consisting of rubberized steel cords to a tire building drum, said conveyor belt being narrower than said strip member, a supporting plate disposed under said conveyor belt and adapted to support said belt, a guide plate extending in parallel with the lengthwise axis of said conveyor belt and disposed above said supporting plate and on one side thereof in such a manner that it can be driven to advance and retreat in the breadthwise direction of said conveyor belt, and a magnet disposed below said supporting plate and toward one side thereof in such a manner that it is driven to advance and retreat in the breadthwise direction of said conveyor belt.

As the strip member carried by the conveyor belt stops in a predetermined position, the guide plate is driven inwardly from its outer position and stops in a position adjoining said strip member. Then, the magnet is caused to be displaced from its inner position to an outer position, whereupon the magnetic force of the magnet acts on the steel cords of the strip member to cause the remainder of the strip member other than the part already in contact with the guide plate to be shifted toward the guide plate. As a consequence, the entire side edge of the strip member is brought into abutment against the guide plate to achieve the necessary correction of the strip member. Then, the conveyor belt is driven again. Since the conveyer belt and the supporting plate are interposed between the strip member and the magnetic exerting a magnet force thereon, the strip member is smoothly transferred because the guide plate in direct contact with the strip member has no magnetic force but merely guides the strip member by its abutment against the edge of the member.

Since the cut end of the strip member is corrected by abutment of the member against the guide plate, it never happens that the strip member is bent outwardly beyond the position of the guide plate. It is not that only the beveled end of the strip, which is delicate and liable to bend, is pulled, but since the entire beveled end of the strip member is pulled by the lengthwise elongated magnet, the beveled end is not locally bent but an exact shape correction is accomplished.

BRIEF DESCRIPTION OF THE DRAWINGS

FIG. 2 is an overall plan view of the above apparatus; and

FIG. 3 is a sectional view taken along the line III—III of FIG. 2.

PREFERRED EMBODIMENTS OF THE INVENTION

Figure 1:
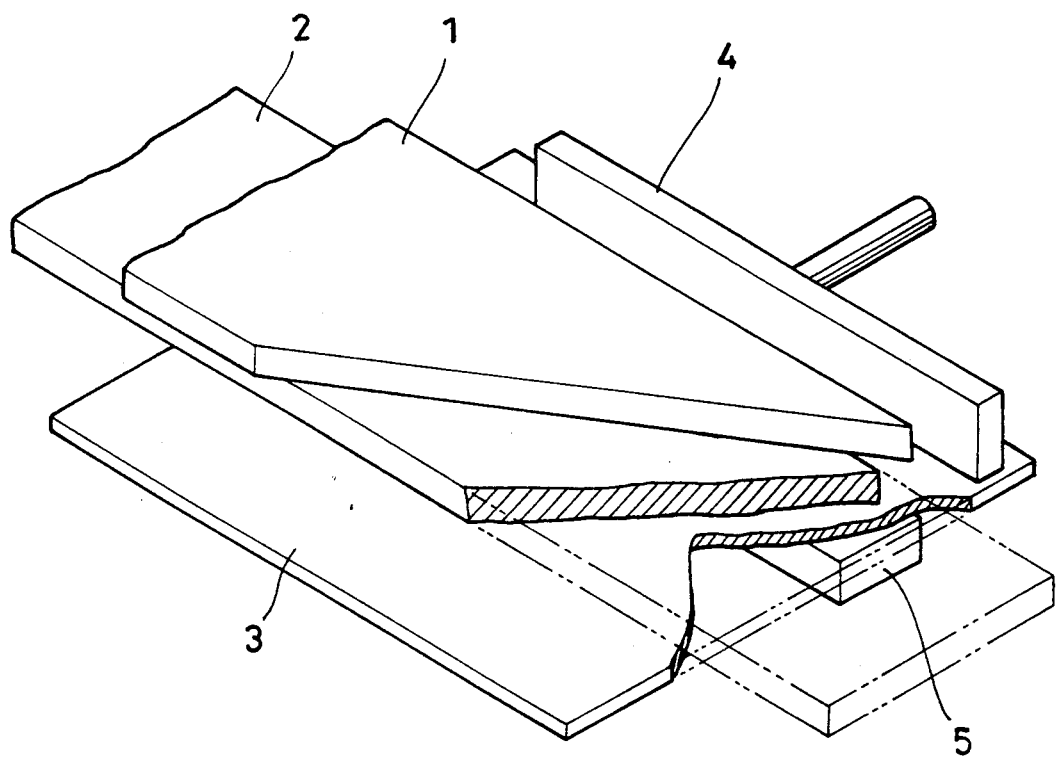
FIG. 1 is a perspective view showing the cardinal part of the apparatus embodying the principles of the invention.

A tire strip member 1 consisting of rubberized steel cords is transferred by a conveyor belt 2 which is somewhat narrower than said strip member in the direction of the arrow shown in FIG. 2, that is toward a tire forming drum. Disposed below this conveyor belt 2 is a supporting plate 3 for supporting the belt 2, and a guide plate 4 extending in parallel with the lengthwise direction of the strip member 1 and adapted to be driven back and forth in the breadthwise direction of the belt 2 is disposed on top of said supporting plate 3 and on one side of the belt 2. Further disposed under the supporting plate 3 and toward one side thereof is a magnet 5 which is adapted to be driven back and forth in the breadthwise direction of the belt 2 across the underside of said supporting member 3.

More specifically, an aluminum supporting plate 3 is disposed relatively close to the leading end of the conveyor belt 2. As shown in FIG. 3, this supporting plate 3 is fixedly mounted on a pair of supporting frame members 6, 6 disposed at right and left as shown and is in contact with the underside of the conveyor belt 2 in relatively slidable relation. An upper motor 8 is mounted, centrally in an upper position, on a side frame member 7 disposed on one side of said supporting plate 3, while a pair of slide guides 9, 9 are mounted on both sides thereof. The reference numeral 10 indicates a threaded shaft 10 which is driven by said upper motor 8 in the breadthwise direction of the conveyor belt 2 and the numeral 11 indicates a pair of guide shafts 11 each of which is slidable with respect to said slide guide 9. The ends of these shafts 10 and 11 which are disposed closer to said conveyor belt 2, are secured to the aforesaid guide plate 4, the latter extending in parallel with the lengthwise axis of the conveyor belt 2. Secured to one end of this guide plate 4 through an upright arm 12 is a photoelectric switch 13. It is, thus, arranged so that as the upper motor 8 is started to drive the guide plate 4 through said threaded shaft 10 in the breadthwise direction inwardly from its outer position and the photoelectric switch 13 detects the strip member 1 below, the top motor 8 is automatically stopped.

On the other hand, a lower motor 14 is rigidly mounted, centrally in a lower position, on said side frame member 7 and a pair of slide guides 15, 15 are also rigidly mounted on both sides thereof. The reference numeral 16 indicates a threaded shaft adapted to be driven by the lower motor 14 in the breadthwise direction of the conveyor belt 2 and the reference numeral 17 indicates a pair of guide shafts 17, 17 which are slidable relative to the respective slide guides 15, 15. The ends of said shafts 16 and 17 which are closer to the conveyor belt 2 are connected to a magnet holder 18 disposed under the supporting plate 3. This magnet holder 18 is a member elongated in the lengthwise direction of the conveyor belt 2, with the magnet 5 attached to this magnet holder 18 being held in slidable contact with the underside of said supporting plate 3.

A supporting plate 3 similar to the above is disposed relatively close to the trailing end of the aforesaid conveyor belt 2, and a guide plate 4 and a magnet 5, both similar to those described above, are disposed on the top side and bottom side, respectively, of said supporting plate 3 in the same manner as described above except that these members are oriented in a reversed direction along the breadthwise axis of the conveyor belt 2.

In the above arrangement, the conveyor belt 2 is stopped when the leading end of the strip member 1 has reached the position indicated by the broken lines in FIG. 2 on the supporting plate 3. Thereupon, the upper motor 8 is actuated to cause the guide plate 4 to advance toward the strip member 1. As the photo-electric switch 13 detects the strip member 1 below, the guide plate 4 ceases to advance and the lower motor 14 is actuated to drive the magnet 5 under the supporting plate 3 outwardly. Then, the magnetic force of the magnet 5 acts upon the steel cords of the strip member 1 so that the remainder of the strip member 1 other than the area which has already been in contact with the guide plate 4 is attracted to the guide plate 4, thus bringing the whole side edge of the strip member 1 into abutment against the guide plate 4. In other words, the clearance between the guide plate 4 and the strip member 1 is thoroughly eliminated, whereby the shape of the strip member 1 is exactly corrected.

Then, the conveyor belt 2 is driven again. However, since the conveyor belt 2 and the supporting plate 3 are interposed between the strip member 1 and the magnetic 5 exerting a magnet force thereon, the strip member 1 is smoothly transferred because the guide plate 4 in direct contact with the strip member 1 has no magnetic force but merely guides the strip member 1 by its abutment against the edge of the member 1.

Then, as the trailing end of the strip member 1 reaches a position on the supporting plate 3 disposed at left in FIG. 2, the conveyance is stopped and the trailing portion of the strip member 1 is corrected in the same manner as above.

What is claimed is:

1. An apparatus for end correction of an automotive tire strip member
comprising a conveyor belt for conveyance of a tire strip member consisting of rubberized steel cords to a tire building drum, said strip member having an end which is beveled, said conveyor belt being narrower than said strip member, a supporting plate disposed under said conveyor belt and adapted to support said belt, a guide plate extending in parallel with the lengthwise axis of said conveyor belt and disposed above said supporting plate and on one side thereof in such a manner that it can be driven to advance and retreat in the breadthwise direction of said conveyor belt, and a magnet disposed below said supporting plate and toward one side thereof in such a manner that it is driven to advance and retreat in the breadthwise direction of said conveyor belt, said magnet being substantially elongated in the lengthwise direction of said conveyor belt, the dimension of said magnet in said lengthwise direction and the dimension of said guide plate in said lengthwise direction each being at least substantially equal to the entire length of said beveled end of said strip member, said magnet and said guide plate being in substantial registry with each other in said lengthwise direction, and means for stopping the conveyor belt when the lengthwise edge of said beveled end is in substantial registry with said magnet and said guide plate in said lengthwise direction, and driving said guide plate advancingly in the breadthwise direction of said conveyor belt into abutment against a portion of said lengthwise edge of said beveled end on the stationary conveyor belt and then driving said magnet retreatingly in the breadthwise direction of said stationary conveyor belt to a position adjacent said guide plate thereby to pull the remainder of said lengthwise edge of said beveled end into abutment against said guide plate so that the entire lengthwise edge of said beveled end abuts against said guide plate and for then driving the conveyor belt again.

* * * * *